(No Model.) 2 Sheets—Sheet 1.

A. J. CONNER.
MACHINE FOR PREPARING TIN PLATES FOR ROOFING.

No. 270,022. Patented Jan. 2, 1883.

WITNESSES:

INVENTOR:
A. J. Conner
BY
ATTORNEYS.

(No Model.)
2 Sheets—Sheet 2.
A. J. CONNER.
MACHINE FOR PREPARING TIN PLATES FOR ROOFING.
No. 270,022.
Patented Jan. 2, 1883.
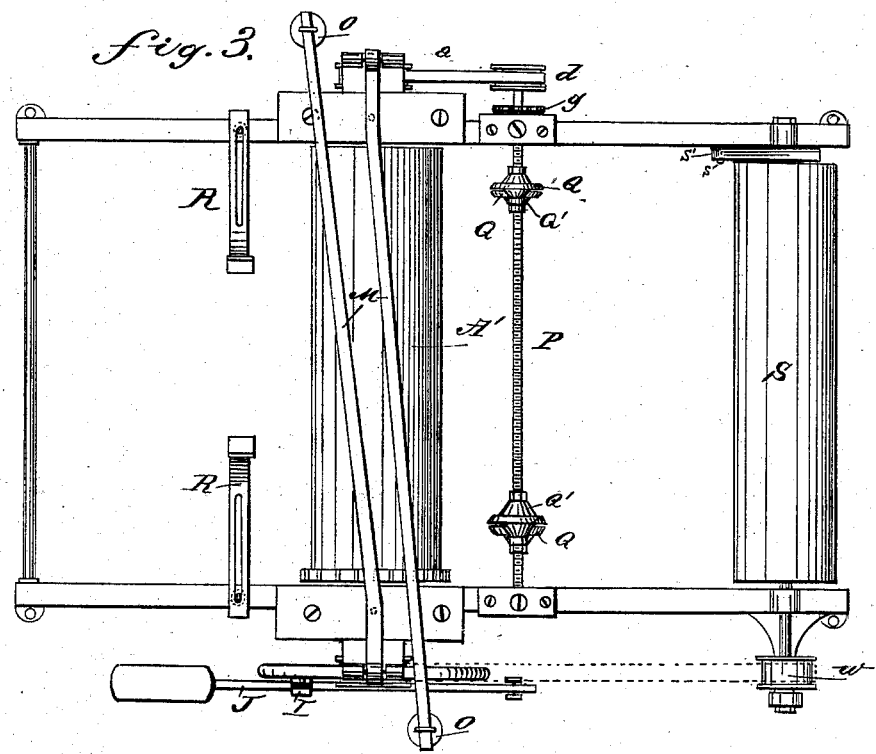
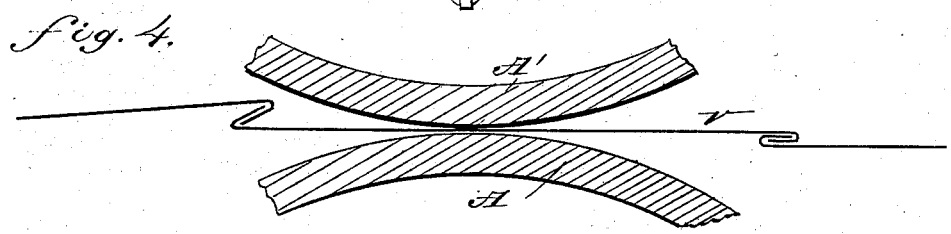
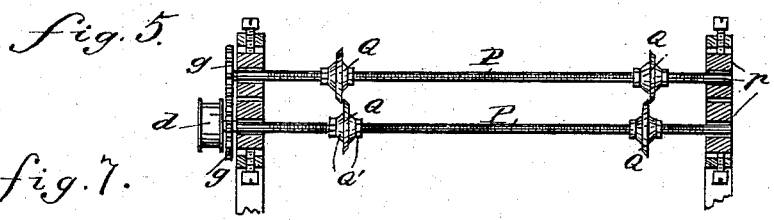
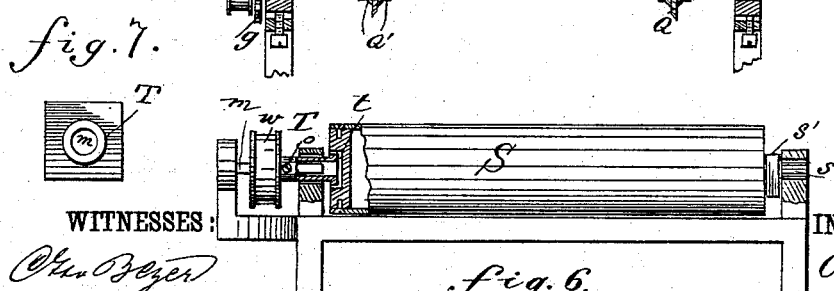
WITNESSES:
Geo. Bezer
C. Sedgwick
INVENTOR:
A. J. Conner
BY
Munn & Co.
ATTORNEYS.

UNITED STATES PATENT OFFICE.

ANDREW J. CONNER, OF LOUISVILLE, KENTUCKY.

MACHINE FOR PREPARING TIN PLATES FOR ROOFING.

SPECIFICATION forming part of Letters Patent No. 270,022, dated January 2, 1883.

Application filed July 25, 1882. (No model.)

*To all whom it may concern:*

Be it known that I, ANDREW JACKSON CONNER, of Louisville, in the county of Jefferson and State of Kentucky, have invented a new and Improved Machine for Preparing Tin Plates for Roofing, of which the following is a full, clear, and exact description.

The object of my invention is to provide a new and improved machine for uniting the ends of a series of tin plates in such a manner that they will form one continuous roll, band, or strip, which machine at the same time cuts the edges of this strip of metal smooth and even and in one continuous straight line.

The invention consists in the peculiar arrangement and construction of the parts, as hereinafter more fully set forth, and pointed out in the claims.

Reference is to be had to the accompanying drawings, forming a part of this specification, in which similar letters of reference indicate corresponding parts in all the figures.

Figure 1:
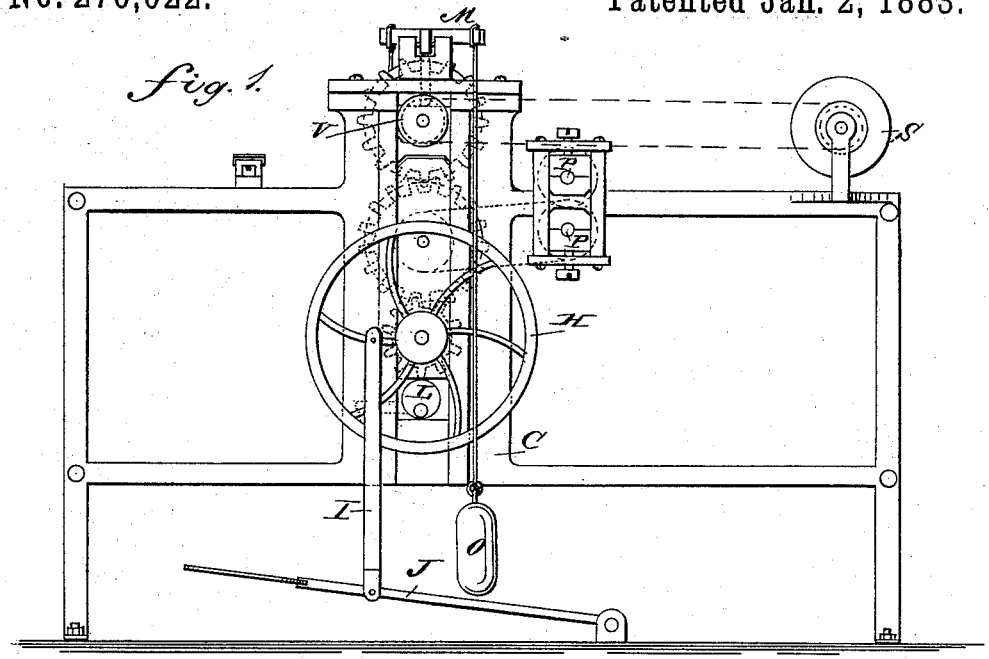
Figure 2:
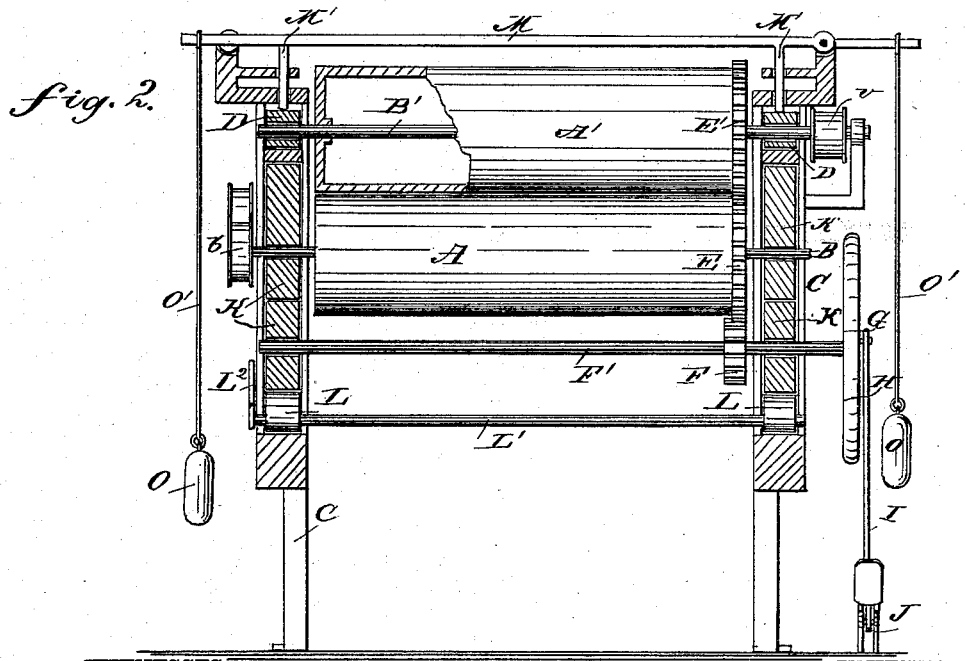

Figure 1 is a longitudinal elevation of my improved machine for preparing tin plates for roofing. Fig. 2 is a cross-sectional elevation of the same. Fig. 3 is a plan view of the same. Fig. 4 is a detail cross-sectional elevation, showing the manner in which the rollers fold the edges of the tin plates. Fig. 5 is a longitudinal elevation of the two screw-shafts on which the cutting-disks are secured. Fig. 6 is a longitudinal elevation of the roller on which the united tin plates are wound, parts being shown in section. Fig. 7 is an end view of a sleeve, showing its end which engages with the recess in the take-up roller squared.

A roller, A, preferably made hollow and of cast-iron, is mounted on a shaft, B, journaled in blocks K in a frame, C, of some suitable construction. A roller, A', which is also hollow, is mounted on a shaft, B', journaled in vertically-adjustable boxes D in vertical recesses or grooves of the frame C. The rollers A and A' are each provided at one end with cog-wheels E and E', respectively, which engage with each other. The cog-wheel E of the lower roller, A, engages with the cog-wheel F, mounted on the horizontal shaft F', provided at the end with a crank-arm, G, and with a fly-wheel, H, which crank-arm is connected by a connecting-rod, I, with a treadle, J, for operating the machine. The blocks K, in which the lower roller, A, and the shaft F' are journaled, rest on cams L, mounted on the ends of a horizontal shaft, L', provided at one end with a handle or arm, L², for turning these cams. The levers M, pivoted on projections of the frame C, extend over the machine-frame, and are provided, near the ends at which they are pivoted, with downwardly-projecting arms resting on the journal-boxes D of the shaft B' of the upper roller, A', and weights O are suspended by suitable cords or wires, O', or are attached by any other suitable devices to the outer ends of these arms or levers M, and thus press the downwardly-projecting arms M' upon the journal-boxes D, and thereby press the roller A' upon the roller A with more or less pressure, as may be desired. Two horizontal shafts, P, which are screw-threaded throughout their entire length, are journaled in adjustable journal-boxes $p$, held in the frame C, on which screw-threaded shafts P the steel cutting-disks Q are mounted, which can be locked in the desired position by means of washers and nuts Q', these disks being of such size that the corresponding disks of the upper and lower shafts P will overlap each other to cut the material passed between them. These shafts P are rotated by a belt, $a$, passing from a pulley, $b$, on one end of the shaft B to a pulley, $d$, on the end of the lower shaft P. The two shafts P are rotated together by means of cog-wheels $g$, mounted thereon and engaging with each other. At the opposite side of the rollers the frame C is provided with two adjustable guides, R, of any desired or suitable construction, which can be adjusted a greater or less distance apart, according to the width of the band or strip of metal sheets that is to be formed. These bands or strips of metal sheets are wound on a roller, S, which has a fixed pivot, $s$, at one end and a recess, $t$, at the opposite end, which recess is adapted to receive the squared end of a sleeve, T, mounted loosely on a shaft, $m$, and provided with a belt-pulley, $w$. The sleeve T is laterally adjustable on the journal $m$, and can be secured in any position on said journal by means of the set-screw $o$ to allow for wear and permit the sleeve T to be laterally slid to the left, (see Fig. 6,) so as to disengage its squared end from the recess $t$ in the roller S and permit the latter to be moved from its bearings. $s'$ represents a catch pivoted to the inner face of the frame near the end of the roller, and adapted to be raised and lowered in a space between the end of the roller S and the frame. When the catch $s'$ is down on the journal $s$ of the roller S the latter is forced laterally to the left, (see Fig. 6,) and the recess in the opposite end of the roller is forced into engagement with the squared end of the sleeve T. When it is desired to remove the roller S the catch $s'$ is raised and the roller S is slid laterally to the right, sufficient space being left between the end of the roller and the frame to disengage the recess in its opposite end from the squared end of the sleeve T, when another roller may be inserted, the sleeve T being adjusted laterally to the left, if necessary, so that the roller may be more readily inserted.

The operation is as follows: The ends of the sheets V of sheet metal are bent over at an angle, as shown in Fig. 4, whereby flanges will be formed at the ends of the sheets, and the ends of the plates are placed over each other in such a manner that the flanges will rest against each other, as shown in Fig. 4. These edges are turned by a machine in common use known as a "brake." The plates thus prepared are passed between the rollers A and A', whereby the bent edges will be flattened down on the surface of the sheets and the joints will be flattened, as shown at the right-hand side of Fig. 4. From between the rollers A the sheets pass between the two screw-threaded shafts P, and their longitudinal edges are cut by the cutting-disks Q, which are previously so adjusted that the cutting-edges of the disks at the opposite ends of the shafts will be separated a distance equal to the desired width of the sheets that pass between the shafts P. The longitudinal edges of the band of sheets, pressed together at the united ends by the rollers A and A', will be cut off evenly and smoothly throughout their entire length as rapidly as the sheets pass between the rollers A and A'. The band of sheets is then wound on the roller S, and when such a length as may be desired has been wound on the roller S the roller is removed, taken out of the roll of tin and replaced or another one is put in place, and the roll of tin sheets on the roller S is taken from the roller and tied by means of a wire or cord, and is then ready to be placed on the roof. The top roller, A', is made adjustable primarily to allow for the passage through the rollers of the extra thickness of tin at the laps. According to the different kinds of metal of which the plates are made, or according to the nature or thickness of the plates, a greater or less pressure must be exerted on the same by the roller A'. For instance, if smooth new plates are used less pressure will be required than if old buckled plates are used. This pressure can be regulated by hanging greater or less weights O on the ends of the levers M. As the journal-boxes of the roller A' are vertically movable, the roller A' can rise automatically to let the thicker parts of the band of sheets pass. After about sixty feet of the metal sheets have been wound on the roller S the cam-shaft L' is turned by means of the arm $L^2$ so that the roller A can descend, then one joint of the sheets can pass without being pressed together, and the lengths of the bands are separated in this manner. As soon as this joint has passed between the rollers the lower roller, A, is raised again and the end of this fresh band or strip is secured to the roller S and wound on the same, the bent end or lip being hooked into a lip formed on the roller S. The roller S is rotated by a belt passing over a pulley, $w$, at the end of the same, and over a pulley, $v$, on the end of the shaft B' of the upper roller, A'.

Instead of the levers M and weights O, as described, for regulating the roller A', rubber springs, held in place by regulating-screws, may be used.

I have shown the machine as operated by foot-power, but any suitable or convenient power may be applied.

Having thus described my invention, I claim as new and desire to secure by Letters Patent—

1. In a machine for preparing tin plates for roofing, the combination, with the rollers A and A', of the vertically-adjustable bearings K, the shaft L', and the cams L, substantially as herein shown and described, and for the purpose of lowering the lower roller, A, substantially as herein shown and described, and for the purpose set forth.

2. In a machine for preparing tin plates for roofing, the combination, with the rollers A A', shafts P, provided with adjustable cutting-disks Q, and adjustable guides R, of the removable roller S, on which the united sheets are wound, and mechanism, substantially as described, whereby the parts are operated, as specified.

3. The combination, with the roller S, having the recess $t$, of the shaft $m$ and adjustable sleeve T, having a squared end and carrying the pulley $w$, substantially as described, and for the purpose set forth.

4. The combination, with the roller S, having journal $s$ and recess $t$, of the catch $s'$, shaft $m$, and sleeve T, having one end squared and carrying the pulley $w$, substantially as described.

ANDREW JACKSON CONNER.

Witnesses:
CHAS. H. MONTZ,
JAMES T. A. BAKER.